June 24, 1958   L. W. WIGHTMAN   2,840,329
RESILIENT MOUNTING MEANS
Filed Nov. 5, 1954
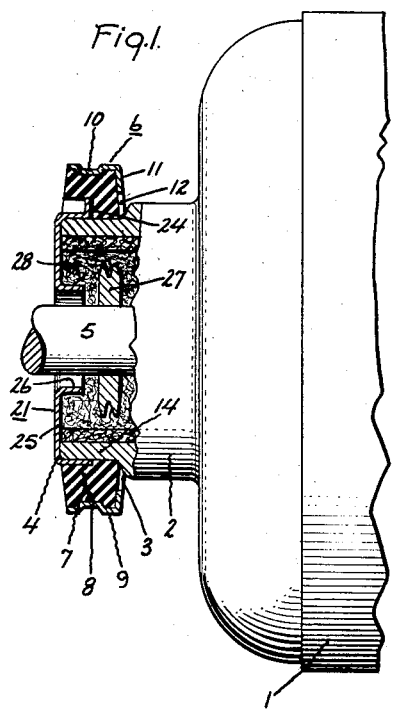
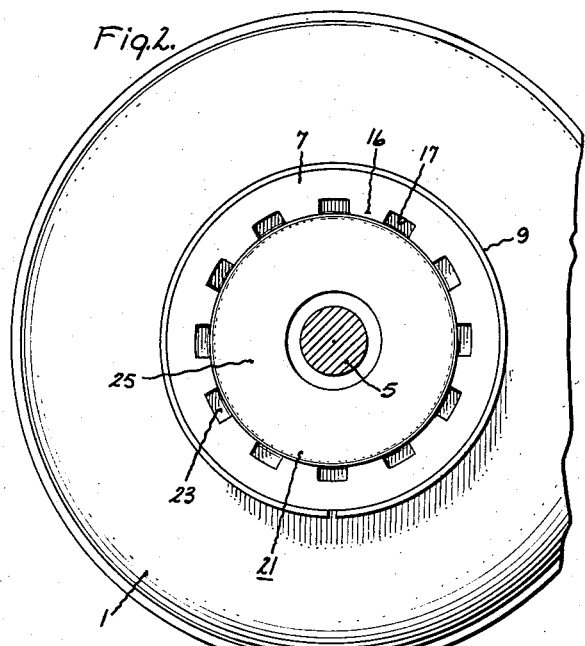
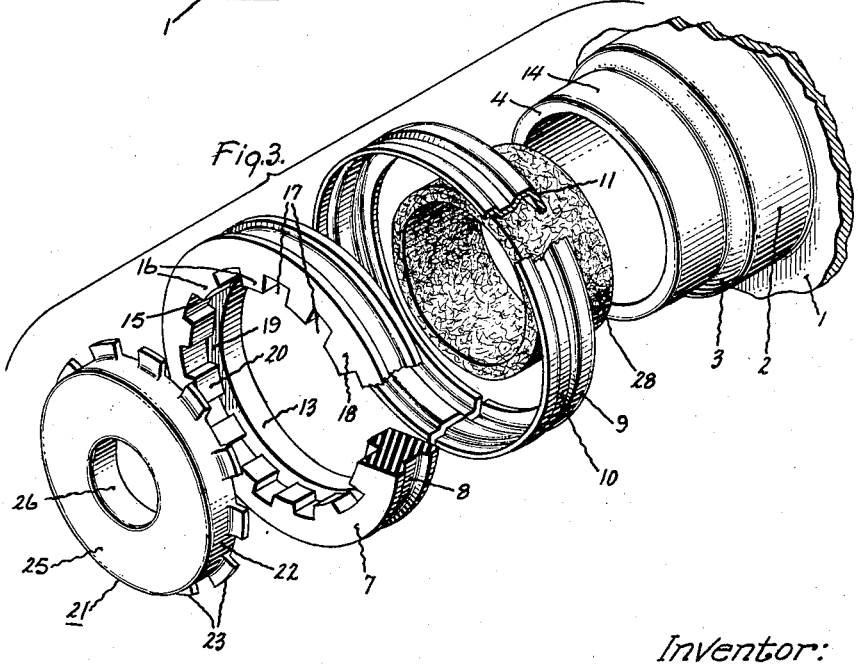
Inventor:
Lawrance W. Wightman,
by
His Attorney.

United States Patent Office 2,840,329
Patented June 24, 1958

2,840,329

RESILIENT MOUNTING MEANS

Lawrance W. Wightman, Fort Wayne, Ind., assignor to General Electric Company, a corporation of New York Application November 5, 1954, Serial No. 467,078

5 Claims. (Cl. 248—26)

This invention relates to resilient mounting means, and more particularly to resilient mounting means for rotating machinery having positive provisions for the elimination of undesirable movements of the mounting.

It is well known to use resilient mountings, such as that shown in Patent 2,074,136 Welch, assigned to the assignee of the present application, for cushioning the vibrations of rotating machinery. These resilient mountings are normally mounted about a hub at each end of the machine, and since there is usually a bearing mounted in each hub, it is necessary to close the end of the hub to prevent loss of lubricant from the bearing structure. Previously, the bearing closing structure and the resilient mounting have been entirely separate, requiring separate parts. Their physical proximity, and the cost of separate manufacture, make it desirable to provide an integral structure which will achieve both functions, that is, the structure for closing the end of the hub to enclose the bearing will also serve as part of the resilient mounting.

In the past, various means have been essayed to maintain the resilient mounting completely stationary on the machine hub so that there was neither axial nor rotary movement of the mounting relative to the hub. While this has been achieved in satisfactory fashion, it became of course an added expense. It is proposed in the present invention to provide means which will not only eliminate separation of the hub closing portion and the resilient mounting, but will cause these means to maintain the resilient mounting stationary on the machine hub. It is further proposed that the above aims be effected by means of a structure which is relatively simple to manufacture and economical insofar as production is concerned.

It is, therefore, an object of this invention to provide a resilient mounting structure which will incorporate the improvements and advantages set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in one embodiment thereof, provides a resilient mounting adapted to be mounted on a machine hub. The hub is provided with a shoulder, and a resilient mounting is adapted to be positioned on the hub against the shoulder, with means being provided for securing it against either axial or rotary movement relative to the hub. The mounting is made up of an annulus of resilient material with at least one recess formed at the inner edge of one of its sides. When the mounting is positioned on the hub, the recess faces toward the end of the hub. In combination with this, there is provided an annular member which has a portion fitting over the end of the hub substantially to cover it. This portion has a peripheral flange which is adapted to be tightly secured about the hub, and on the flange there is at least one outwardly extending projection which, when the mounting and the annular member are positioned on the hub, is arranged to abut against the annulus within the recess so as to force the annulus against the shoulder of the hub to prevent axial movement of the mounting on the hub. Rotary movement of the mounting on the hub is prevented by the fact that the projection fits relatively snugly within the recess and, therefore, since the annular member is tightly secured on the hub, the mounting cannot be rotated without first tearing the material of the annulus.

In the drawing, Figure 1 is a fragmentary side view, partly in cross section, of a rotary machine having the improved resilient mounting structure;

Figure 2 is an end view, partly in cross section, of the structure of Figure 1; and Figure 3 is an exploded view in perspective of the improved resilient mounting structure of this invention.

Referring now to the figures of the drawing, there is shown a casing 1 for a rotary machine, such as, for instance, an electric motor. Casing 1 terminates in a hub portion 2 having a shoulder 3 at a predetermined distance from end 4 of the hub. The rotatable shaft 5 of the machine extends out through hub 2 and, generally, is rotatably supported by a bearing structure (not shown) which is secured within the hub.

In order to mount the machine to a base (not shown) so that the vibration caused by the rotation of shaft 5 will be substantially prevented from reaching the base, there is provided a resilient mounting, generally indicated as 6, of the general type described in the aforementioned Welch patent. Mounting member 6 has an annulus 7 composed of a resilient material such as rubber. The outer surface of annulus 7 has a peripheral groove 8 therein, and an outer metallic ring 9 has a similar mating indentation 10. In the present embodiment, ring 9 is shown with an inwardly extending flange 11 which, when the ring is positioned about the annulus 7, is in contact with surface 12 of the annulus. Flange 11 is provided to prevent axial movement of annulus 7 relative to ring 9 if the ring is not bonded to the annulus. It will, of course, be understood that flange 11 may be omitted where ring 9 is bonded to annulus 7 since the bond would be adequate to prevent the undesired relative axial movement.

As appears most clearly in Figure 3, axial portion 13 of the inner surface of annulus 7 is made with a relatively smooth surface and has a diameter substantially the same as that of part 14 of hub 2 so that it will fit relatively closely about hub part 14 when the resilient mounting member 6 is positioned thereon. The other axial portion 15 of the iner surface of annulus 7 is made up of a series of inwardly projecting portions 16 which do not, however, even at their innermost point, extend inwardly as far as surface 13. Formed between portions 16 are a plurality of recesses 17 which are located at the inner edge of side 18 of annulus 7. Recesses 17 extend only as far as wall 19 which is formed by the inwardly extending portion 13.

It will be seen from Figures 1 and 3 that when annulus 7 is mounted on hub 2 so that the surface of portion 13 is substantially in contact with part 14 of the hub, inner surface 20 of projecting portions 16, which surfaces lie on a circle concentric with and having a larger diameter than the surface of portion 13, will be spaced a predetermined distance from the surface of hub portion 14. An annular member 21 is mounted over end 4 of hub 2 so that a peripheral flange 22 formed on member 21 will tightly engage the surface of part 14 of hub 2. Flange 22 will substantially fill the space that was provided between inner surface 20 of projections 16 and the surface of hub part 14. A plurality of outwardly extending finger-like projections 23 are formed at the end of flange 22, and when both member 21 and annulus 7 are positioned on hub 2 each projection 23 of the member 21 will fit within a recess 17 of annulus 7 so that the face 24 of the projection is substantially in abutment with wall 19 of annulus 7. Since member 21 is securely mounted on hub 2, the abutment of projections 23 with wall 19 will secure the mounting 6 against shoulder 3 of the hub and eliminate undesirable axial movement of the mounting on the hub. In addition, the engagement of each projection 23 within a recess 17 of the annulus 7 will eliminate any tendency of the mounting 6 to rotate about the hub.

Member 21 has a portion 25 which is preferably positioned substantially in a vertical plane in the axis of rotation of shaft 5 when the annular member is mounted over the hub 2. As is seen in Figures 1 and 2, portion 25 of member 21 extends inwardly relatively close to shaft 5 and is then provided with a re-entrant flange 26 which extends substantially parallel to the axis of shaft 5. It will, of course, be understood that where shaft 5 does not extend out through hub 2, portion 25 will entirely cover end 4 of the hub, and no re-entrant flange will be provided. Portion 25 and flange 26 of member 21 together form a closure for the end 4 of hub 2 and fulfill the functions of preventing foreign matter from entering a bearing located within the hub and preventing the loss of lubricant from such a bearing, which may, for instance, be provided with a lubricant slinger 27 and a felt strip 28 for conducting lubricant back into the bearing from the lubricant slinger.

It will be seen from the foregoing that the structure described provides a unitary member which acts as a part of the resilient mounting to secure it immovably on hub 2 and at the same time forms a closure for the end of the hub to provide the necessary protection to apparatus located within the hub 2 of the housing 1. The fact that a single member fulfills these functions in lieu of the plurality of elements which has heretofore been required permits a substantial increase in the economy of production. In addition, the member is one having a relatively simple shape which is not at all difficult to manufacture; it may be formed, for instance, by punching or any other desired means. The prevention of any movement by the mounting relative to the machine hub is achieved in a positive manner and it will be seen that before it would be possible for mounting member 6 to move relative to hub 2 there would have to be actual destruction of one of the elements of the structure.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. In a machine, an open-ended hub having a shoulder formed thereon, a resilient mounting secured on said hub against said shoulder thereof, and a member for securing said mounting against axial and rotary movement relative to said hub; said mounting comprising an annulus of resilient material having a recess formed at the inner edge of a side thereof, said annulus being mounted on said hub against the shoulder thereof with said recess facing toward the end thereof, said member having a portion substantially covering the end of said hub, a peripheral flange on said portion tightly secured about said hub, and a projection extending outwardly from said flange and abutting against said annulus within said recess.

2. In a machine, an open-ended hub having a shoulder formed thereon, a resilient mounting mounted on said machine hub against said shoulder thereof, and a member for securing said mounting against axial and rotary movement relative to said hub; said mounting comprising an annulus of resilient material having a plurality of spaced recesses formed at the inner edge of a side thereof, said annulus being mounted on said hub against the shoulder thereof with said recesses facing toward the end thereof, said member having a portion covering the end of said hub, a peripheral flange on said portion tightly secured about said hub, said flange extending within said annulus, and a plurality of projections formed at the end of said flange and respectively extending outwardly, said projections being respectively arranged within said recesses abutting against said annulus.

3. In a machine, an open-ended hub and a shoulder formed thereon, a resilient mounting mounted on said hub against said shoulder thereof, and a member for securing said mounting against axial and rotary movement relative to said hub; said mounting comprising an annulus of resilient material having an axial portion of its inner surface formed with substantially the same diameter as said hub whereby said portion fits snugly about said hub, said annulus having the remainder of its inner surface formed as a series of spaced inwardly extending projections, said projections forming therebetween recesses extending respectively from one side of said annulus to said axial portion, said member having a portion substantially covering the end of said hub, a peripheral flange on said portion tightly secured about said hub, said flange extending within said annulus, and a plurality of projections formed at the end of said flange and respectively extending outwardly, said outwardly extending projections being respectively arranged within said recesses abutting against the side of said axial portion.

4. In a machine, an open-ended hub and a shoulder formed thereon, a resilient mounting secured on said hub against said shoulder thereof, and a member for securing said mounting against axial and rotary movement relative to said hub; said mounting comprising an annulus of resilient material having an axial portion of its inner surface formed with substantially the same diameter as said hub whereby said portion fits snugly about said hub, said annulus having the remainder of its inner surface formed as a series of spaced inwardly extending projections, said projections forming therebetween recesses extending respectively from one side of said annulus to said axial portion, said projections having inner surfaces arranged about a circle having a larger diameter than the diameter of said axial portion, and a metallic outer ring arranged about said annulus and secured to the outer surface thereof, said member having a portion substantially covering the end of said hub, a peripheral flange on said portion tightly secured about said hub, said flange extending axially within said annulus in abutment with the inner surfaces of said inwardly extending projections respectively, and a plurality of finger-like projections formed respectively at the end of said flange and extending outwardly, said projections abutting against the side of said axial portion within said recesses.

5. In a machine, a hub, a rotatable shaft mounted therein to extend from an end thereof, said hub having a shoulder formed thereon, a resilient mounting mounted on said hub against said shoulder, and an annular member for securing said mounting against axial and rotary movement relative to said hub; said mounting comprising an annulus of resilient material having an axial portion of its inner surface formed with substantially the same diameter as said hub whereby said portion fits snugly about said hub, said annulus having the remainder of its inner surface formed as a series of like equispaced inwardly extending projections, said projections forming therebetween equispaced recesses extending respectively from one side of said annulus to said axial portion, a metallic outer ring arranged about said annulus and secured to the outer surface thereof, said annular member having a portion covering a substantial part of the end of said hub, an axially extending flange formed at the inner edge of said annular member portion substantially concentric with said shaft and in proximity thereto, a peripheral flange on said portion tightly secured about said hub, said flange extending axially within said annulus in abutment with the inner surfaces of said inwardly extending projections respectively, and a plurality of equispaced finger-like projections formed respectively at the end of said flange and extending outwardly, said outwardly extending projections being formed with substantially the same shape and spacing as said recesses, said outwardly extending projections respectively abutting against the side of said axial portion within said recesses thereby to secure said annulus against said shoulder of said hub and in non-rotatable relation therewith.

References Cited in the file of this patent

UNITED STATES PATENTS

| | | |
|---|---|---|
| 2,074,136 | Welch | Mar. 16, 1937 |
| 2,349,215 | Wahlborg | May 16, 1944 |
| 2,425,654 | Storch | Aug. 12, 1947 |
| 2,635,923 | Isham et al. | Apr. 21, 1953 |